April 20, 1943. HENRI-GEORGES DOLL 2,316,942
APPARATUS FOR MEASURING TEMPERATURES IN BORE HOLES
Original Filed Dec. 27, 1937
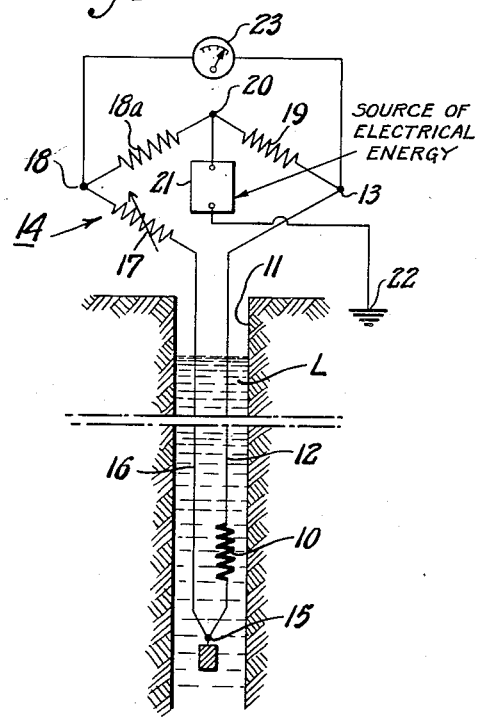
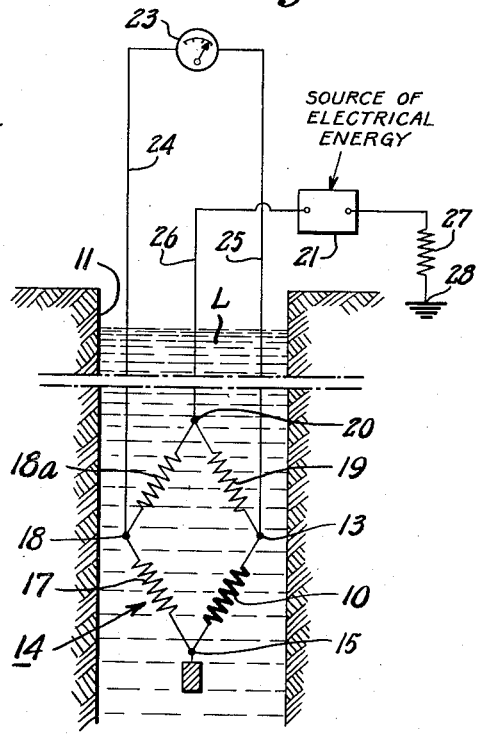
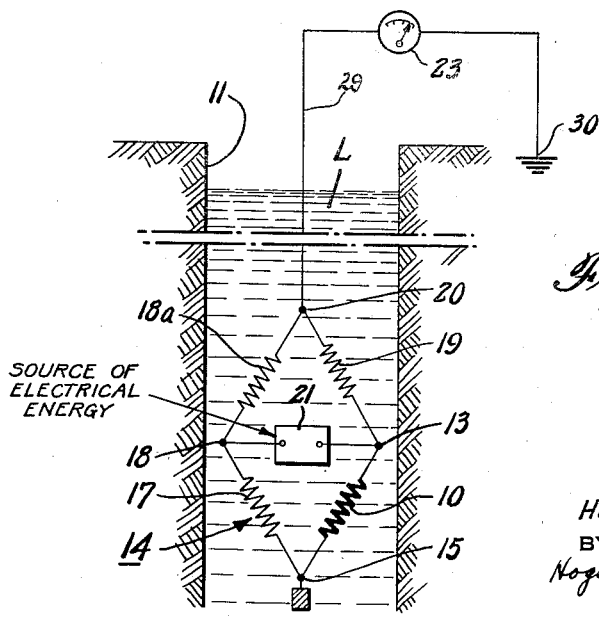
INVENTOR:
Henri-Georges Doll,
BY
Noquet, Neary & Campbell
ATTORNEYS Patented Apr. 20, 1943

2,316,942

UNITED STATES PATENT OFFICE 2,316,942

APPARATUS FOR MEASURING TEMPERATURES IN BOREHOLES

Henri-Georges Doll, Houston, Tex., assignor to Schlumberger Well Surveying Corporation, Houston, Tex., a corporation of Delaware Original application December 27, 1937, Serial No. 181,879. Divided and this application May 6, 1941, Serial No. 392,075. In France January 7, 1937

8 Claims. (Cl. 73—362)

The present invention relates to apparatus for obtaining indications of temperatures in relatively inaccessible places, such as in bore holes drilled into the earth, for example, although it is not limited to such use.

In the current practice, it is customary to employ resistance thermometers for obtaining indications of temperatures in bore holes drilled into the earth. Usually a resistance thermometric element is lowered to different depths in the bore hole on an insulated two-conductor cable and measurements are made of variations in the resistance of the circuit by means of a Wheatstone bridge or other analogous apparatus.

As a practical matter, the cable is wound on a winch at the surface of the earth in order that the thermometric element may be raised and lowered in the bore hole and the connections between the ends of the conductors in the cable and the Wheatstone bridge are usually made through conventional slip rings and brushes. Experience has demonstrated that this apparatus is not entirely satisfactory because of errors introduced by variations in the contact resistance of the slip rings and brushes used and by variations in the resistance of the cable conductors resulting from variations in temperature at different depths in the bore hole.

In my copending application, Serial No. 181,879, filed December 27, 1937, for Arrangement for measuring temperatures at a distance, particularly in a bore hole, and which resulted in Patent No. 2,249,751 dated July 22, 1941, of which the present application is a division, there is disclosed apparatus which is designed to minimize such errors. This is accomplished by lowering at least one of the apices of the Wheatstone bridge into the bore hole to the level at which the measurements are to be made, thereby substantially eliminating errors introduced by variations in the resistance of the connecting cables.

The present application is addressed to analogous apparatus in which a ground return is employed for the purpose of reducing the number of conductors required in carrying out temperature measurements in a bore hole.

The invention may be better understood from the following detailed description of several representative embodiments taken in conjunction with the accompanying drawing, in which Fig. 1 is a schematic diagram of apparatus constructed in accordance with the present invention for measuring temperatures in a bore hole;

Fig. 2 is a schematic diagram of an embodiment of the invention in which the entire Wheatstone bridge is lowered into the bore hole; and Fig. 3 illustrates schematically a further embodiment of the invention employing only a single conductor cable.

In the embodiment of the invention which is illustrated in Fig. 1 of the drawing, a temperature-responsive resistance element 10 made of a metal having relatively high temperature coefficient of resistivity is lowered into a bore hole 11, which usually contains a liquid L. The element 10 is connected in series with a conductor 12 in the cable (not shown) on which the apparatus is suspended in the bore hole 11, the upper end of which is connected to one of the apices 13 of a conventional type Wheatstone bridge 14 located at the surface of the earth.

The thermometric element 10 is connected at its lower end to a ground point 15 in the liquid L in the bore hole 10, which constitutes one of the apices of the bridge 14 and which is connected through a second conductor 16 in the supporting cable and through a variable resistance 17 at the surface of the earth to another apex 18 of the bridge 14. The bridge 14 also includes two fixed resistors 18a and 19, preferably made of constantan or manganin or any other suitable alloy having a negligible temperature coefficient of resistivity, and a fourth apex 20. The variable resistance 17 should also preferably be made of the same material as the resistors 18a and 19.

At the surface of the earth is located a suitable source of electrical energy 21, one terminal of which is connected to the apex 20 of the bridge 14 and the other terminal of which is connected to the ground point 22 at the surface, the circuit being completed through the liquid L and the intervening earth formations between the ground point 22 and the grounded apex 15 in the bore hole 10. It may be desirable in certain cases to insert a relatively large resistance in series with the source of electrical energy 21 in order to minimize any material variations in the current supplied therefrom. However, such a stabilizing resistance is not necessary.

A conventional type instrument 23 for measuring or recording differences of potential is connected to the apices 18 and 13 of the bridge. The potential indicating instrument 23 should preferably be of the recording type so that a continuous record of potential differences, which are related to temperatures in the bore hole, may be obtained as the thermometric element 10 is moved through the bore hole 11.

In practice, the resistances 17, 18a and 19 may all have the same value, which may, if desired, be made equal to the resistance of the thermometric element 10 at a given reference temperature, preferably the average temperature in the bore hole. As the thermometric element 10 traverses the bore hole 11 during the course of a run, the various temperatures encountered will unbalance the bridge 14 and produce corresponding potential differences across the apices 18 and 13 thereof, which will be indicated by the indicating means 23. The latter may, of course, be calibrated to read temperatures directly, although that is not necessary. Alternatively, the actual resistance variations in the thermometric element 10 may be measured in the conventional manner by noting the adjustment which must be made in the variable resistance 17 to maintain the bridge 14 balanced.

Inasmuch as the cable conductors 16 and 12 are included in the two adjacent lower arms of the Wheatstone bridge 14, respectively, it will be readily apparent that variations in the resistances of those conductors with temperature will have little or no effect on the measurements made. Furthermore, by utilizing a ground return for the energizing circuit of the bridge, only two conductors are required for making the measurements.

If desired, the entire Wheatstone bridge may be lowered into the bore hole as shown in Fig. 2. In this embodiment, the potential indicating instrument 23 is connected to the apices 18 and 13 of the bridge 14 through the conductors 24 and 25, respectively. A third conductor 26 is connected to the apex 20 of the bridge 14 and to one terminal of the source of electrical energy 21, the other terminal of which is connected through a relatively high resistance 27 to the ground point 28 at the surface. The function of the resistance 27 is to prevent any material variation in the current supplied to the Wheatstone bridge 14 such as might be caused by variations in the resistance of the intervening formations between the apex 15 of the bridge 14 and the ground point 28 at the surface of the earth.

It is also possible to use only a single conductor for obtaining indications of temperature in the bore hole as illustrated in Fig. 3. This is accomplished by lowering the source of current into the bore hole with the Wheatstone bridge. A single conductor 29 is connected to the apex 20 of the bridge 14 and to the potential indicating instrument 23 at the surface of the earth, the other terminal of which is grounded at the point 30. The potential indicating instrument 23 should preferably have a relatively high resistance in order that the indications obtained will not be materially influenced by variations in the resistance of the intervening formations between the apex 15 of the bridge and the ground point 30.

From the foregoing, it will be readily apparent that the invention provides new and improved apparatus for measuring temperatures in relatively inaccessible places such as bore holes, for example, in which errors produced by variations in the resistance of the conductors in the supporting cable have been substantially eliminated. Moreover, by employing a ground return either for the energizing circuit or for the indicating circuit the number of conductors required for carrying out temperature measurements in a bore hole may be reduced to a minimum.

While several specific embodiments have been described and illustrated herein, the invention is not intended to be restricted thereto, but is susceptible of numerous changes in form and detail within the scope of the appended claims.

I claim:

1. Apparatus for obtaining indications of temperatures in a bore hole, comprising a temperature-responsive resistance element lowered into the bore hole, an electrical network connected to said resistance element and forming a Wheatstone bridge having at least four apices, at least one of which is disposed in the bore hole with said resistance element and is connected to ground therein, an electrical circuit connected to the apex of the bridge opposite said grounded apex and to a ground point at the surface of the earth, a second electrical circuit connected to the other two opposite apices of the bridge, a source of electrical energy in one of said electrical circuits and electrical indicating means in the other of said electrical circuits.

2. Apparatus for obtaining indications of temperatures in a bore hole, comprising a temperature-responsive resistance element lowered into the bore hole, an electrical network connected to said resistance element and forming a Wheatstone bridge having at least four apices, at least one of which is disposed in the bore hole with said resistance element and is connected to ground therein, a source of electrical energy, an electrical circuit connecting said source to the apex of the bridge opposite said grounded apex and to a ground point at the surface of the earth, electrical indicating means and a second electrical circuit connecting said indicating means to the other two opposite apices of the bridge.

3. Apparatus for obtaining indications of temperatures in a bore hole, comprising a temperature-responsive resistance element lowered into the bore hole, an electrical network connected to said resistance element and forming a Wheatstone bridge having at least four apices, at least one of which is disposed in the bore hole with said resistance element and is connected to ground therein, a source of electrical energy at the surface of the earth, an electrical circuit connecting said source to the apex of the bridge opposite said grounded apex and to a ground point at the surface of the earth, electrical indicating means at the surface of the earth, and a second electrical circuit connecting said indicating means to the other two opposite apices of the bridge.

4. Apparatus for obtaining indications of temperatures in a bore hole, comprising a temperature-responsive resistance element lowered into the bore hole, an electrical network connected to said resistance element and forming a Wheatstone bridge having at least four apices, at least one of which is disposed in the bore hole with said resistance element and is connected to ground therein, electrical indicating means at the surface of the earth, an electrical circuit connecting said indicating means to the apex of the bridge opposite said grounded apex and to a ground point at the surface of the earth, a source of electrical energy disposed in the bore hole with said thermometric element, and a second electrical circuit connecting said source to the other two opposite apices of the bridge.

5. Apparatus for obtaining indications of temperatures in a bore hole, comprising a temperature-responsive resistance element lowered into the bore hole, an electrical conductor connected to one end of said element and extending to the surface of the earth, a second conductor in the bore hole connected to the other end of said element and to ground and extending to the surface of the earth, a plurality of electrical resistances at the surface of the earth, electrically connected to each other and to said conductors to form a Wheatstone bridge having at least four apices of which the ground connection in the bore hole constitutes one, a source of electrical energy at the surface of the earth, an electrical circuit connecting said source to ground at the surface and to the apex of the bridge which is opposite the apex in the bore hole, and electrical indicating means connected to the two other opposite apices of the bridge.

6. Apparatus for obtaining indications of temperatures in a bore hole, comprising a temperature-responsive resistance element lowered into the bore hole, a plurality of electrical resistances disposed in the bore hole with said element and electrically connected thereto to form a Wheatstone bridge having at least four apices, one of which is connected to ground in the bore hole, electrical means comprising a source of electrical energy at the surface of the earth, an electrical circuit connecting said electrical means to the apex opposite said grounded apex and to a ground point at the surface of the earth, and a second electrical circuit including electrical indicating means connected to the two other opposite apices of the bridge.

7. Apparatus for obtaining indications of temperatures in a bore hole, comprising a Wheatstone bridge lowered into the bore hole and having a temperature-responsive resistance element in one arm thereof, said bridge having at least four apices, one of which is connected to ground in the bore hole, a source of electrical energy at the surface of the eaarth, having one terminal connected to ground at the surface, an electrical conductor connecting the other terminal of said source with the apex of the bridge opposite said grounded apex, electrical indicating means at the surface of the earth, and electrical connections between the two other opposite apices of the bridge and said indicating means.

8. Apparatus for obtaining indications of temperatures in a bore hole, comprising a Wheatstone bridge lowered into the bore hole and having a temperature-responsive resistance element in one arm thereof, said bridge having at least four apices, one of which is connected to ground in the bore hole, electrical indicating means at the surface of the earth, having one terminal connected to ground at the surface, an electrical conductor connecting the other terminal of said indicating means to the apex of the bridge opposite said grounded apex, and a source of electrical energy disposed in the bore hole with said bridge and connected to the two other opposite apices thereof.

HENRI-GEORGES DOLL.